(12) United States Patent
Wu et al.

(10) Patent No.: US 10,123,028 B2
(45) Date of Patent: Nov. 6, 2018

(54) SYNTAX PARSING APPARATUS WITH MULTIPLE SYNTAX PARSING CIRCUITS FOR PROCESSING MULTIPLE IMAGE REGIONS WITHIN SAME FRAME OR PROCESSING MULTIPLE FRAMES AND RELATED SYNTAX PARSING METHOD

(71) Applicant: MEDIATEK INC., Hsin-Chu (TW)

(72) Inventors: Ming-Long Wu, Taipei (TW); Chia-Yun Cheng, Hsinchu County (TW); Yung-Chang Chang, New Taipei (TW)

(73) Assignee: MEDIATEK INC., Hsin-Chu (TW)

( * ) Notice: Subject to any disclaimer, the term of this patent is extended or adjusted under 35 U.S.C. 154(b) by 195 days.

(21) Appl. No.: 15/028,717

(22) PCT Filed: Sep. 17, 2015

(86) PCT No.: PCT/CN2015/089828
§ 371 (c)(1),
(2) Date: Apr. 12, 2016

(87) PCT Pub. No.: WO2016/041507
PCT Pub. Date: Mar. 24, 2016

(65) Prior Publication Data
US 2016/0241863 A1     Aug. 18, 2016

Related U.S. Application Data

(60) Provisional application No. 62/051,330, filed on Sep. 17, 2014.

(51) Int. Cl.
*H04N 19/70* (2014.01)
*H04N 19/436* (2014.01)
(Continued)

(52) U.S. Cl.
CPC ......... *H04N 19/436* (2014.11); *H04N 19/127* (2014.11); *H04N 19/172* (2014.11);
(Continued)

(58) Field of Classification Search
CPC .................................................. H04N 19/436
See application file for complete search history.

(56) References Cited

U.S. PATENT DOCUMENTS

| 5,646,688 A | 7/1997 | Hashimoto |
| 6,148,033 A | 11/2000 | Pearlstein |

(Continued)

FOREIGN PATENT DOCUMENTS

| CN | 1467726 A | 1/2004 |
| CN | 1703098 A | 11/2005 |

(Continued)

OTHER PUBLICATIONS

"International Search Report" dated Dec. 1, 2015 for International application No. PCT/CN2015/089828, International filing date:Sep. 17, 2015.

*Primary Examiner* — Jayanti K Patel
*Assistant Examiner* — Irfan Habib
(74) *Attorney, Agent, or Firm* — Winston Hsu

(57) ABSTRACT

A syntax parsing apparatus includes a plurality of syntax parsing circuits and a dispatcher. Each of the syntax parsing circuits has at least entropy decoding capability. The syntax parsing circuits generate a plurality of entropy decoding results of a plurality of image regions within a same frame, respectively. The dispatcher assigns bitstream start points of the image regions to the syntax parsing circuits, and triggers the syntax parsing circuits to start entropy decoding, respectively.

20 Claims, 13 Drawing Sheets

(51) Int. Cl.
*H04N 19/593* (2014.01)
*H04N 19/91* (2014.01)
*H04N 19/127* (2014.01)
*H04N 19/172* (2014.01)
*H04N 19/174* (2014.01)
*H04N 19/184* (2014.01)
*H04N 19/44* (2014.01)

(52) U.S. Cl.
CPC ......... *H04N 19/174* (2014.11); *H04N 19/184* (2014.11); *H04N 19/44* (2014.11); *H04N 19/593* (2014.11); *H04N 19/70* (2014.11); *H04N 19/91* (2014.11)

(56) References Cited

U.S. PATENT DOCUMENTS

| | | | | |
|---|---|---|---|---|
| 7,302,516 B2 * | 11/2007 | Hanaki | ............... | H04N 19/51 375/E7.102 |
| 7,848,407 B2 * | 12/2010 | Yoon | ............... | H04N 21/8451 375/240.01 |
| 7,983,343 B2 * | 7/2011 | Pearson | ............... | H03M 7/4006 375/240.25 |
| 8,121,196 B2 * | 2/2012 | Katsavounidis | ....... | H04N 19/44 375/240.01 |
| 8,483,279 B2 * | 7/2013 | Hiramatsu | ............ | H04N 19/423 375/240.16 |
| 9,014,494 B2 * | 4/2015 | Esenlik | ............... | H04N 19/70 382/233 |
| 9,020,284 B2 * | 4/2015 | Unno | ............... | H04N 19/172 382/232 |
| 9,247,258 B2 * | 1/2016 | Coban | ............... | H04N 19/105 |
| 9,332,259 B2 * | 5/2016 | Wang | ............... | H04N 19/46 |
| 9,414,059 B2 * | 8/2016 | Tanaka | ............... | H04N 19/176 |
| 9,451,252 B2 * | 9/2016 | Chen | ............... | H04N 19/70 |
| 9,467,700 B2 * | 10/2016 | Wang | ............... | H04N 19/597 |
| 9,596,469 B2 * | 3/2017 | George | ............... | H03M 7/3071 |
| 9,602,841 B2 * | 3/2017 | Mathew | ............... | H04N 19/30 |
| 9,648,335 B2 * | 5/2017 | Rapaka | ............... | H04N 19/597 |
| 9,838,703 B2 * | 12/2017 | Katsavounidis | ...... | H04N 19/436 |
| 9,973,768 B2 * | 5/2018 | Budagavi | ............ | H04N 19/436 |
| 9,973,781 B2 * | 5/2018 | Schierl | ............... | H04N 19/70 |
| 2005/0265449 A1 * | 12/2005 | Yoon | ............... | H04N 21/8451 375/240.12 |
| 2006/0109912 A1 * | 5/2006 | Winger | ............... | H04B 1/66 375/240.23 |
| 2008/0037656 A1 * | 2/2008 | Hannuksela | ..... | H04N 21/23614 375/240.26 |
| 2013/0114735 A1 * | 5/2013 | Wang | ............... | H04N 19/176 375/240.23 |
| 2013/0182775 A1 * | 7/2013 | Wang | ............... | H04N 19/46 375/240.24 |
| 2015/0016551 A1 * | 1/2015 | Esenlik | ............... | H04N 19/117 375/240.29 |

FOREIGN PATENT DOCUMENTS

| | | |
|---|---|---|
| CN | 101268697 A | 9/2008 |
| CN | 101616323 A | 12/2009 |
| JP | 2000236546 A | 8/2000 |
| JP | 201378100 A | 4/2013 |
| KR | 1998030414 | 7/1998 |
| WO | 2013/144144 A1 | 10/2013 |

* cited by examiner

SYNTAX PARSING APPARATUS WITH MULTIPLE SYNTAX PARSING CIRCUITS FOR PROCESSING MULTIPLE IMAGE REGIONS WITHIN SAME FRAME OR PROCESSING MULTIPLE FRAMES AND RELATED SYNTAX PARSING METHOD

CROSS REFERENCE TO RELATED APPLICATIONS

This application claims the benefit of U.S. provisional application No. 62/051,330, filed on Sep. 17, 2014 and incorporated herein by reference.

TECHNICAL FIELD

The present invention relates to video processing, and more particularly, to a syntax parsing apparatus with multiple syntax parsing circuits for processing multiple image regions (e.g., tiles or slices) within the same frame or processing multiple frames and a related syntax parsing method.

BACKGROUND

The conventional video coding standards generally adopt a block based coding technique to exploit spatial and temporal redundancy. For example, the basic approach is to divide the whole source frame into a plurality of blocks, perform intra prediction/inter prediction on each block, transform residues of each block, and perform quantization and entropy encoding. Besides, a reconstructed frame is generated in a coding loop to provide reference pixel data used for coding following blocks. For certain video coding standards, in-loop filter(s) may be used for enhancing the image quality of the reconstructed frame.

A video decoder is used to perform an inverse operation of a video encoding operation performed by a video encoder. For example, an entropy encoding circuit in the video encoder is used to generate an encoded bitstream, while an entropy decoding circuit in the video decoder is used to decode the encoded bitstream. The arithmetic coding may be employed by the entropy encoding. Hence, the entropy encoding circuit refers to a probability table to perform the entropy encoding, and the entropy decoding circuit of the video decoder also refers to the same probability table to perform the entropy decoding.

Since the video content is inherently non-stationary in nature, adaptation of the probability table to account for changing statistics is critical in each of the video encoder and the video decoder compliant with an advanced video coding standard such as VP9. Further, ultra high definition (UHD) video is very popular in recent years. For example, the UHD video may have a resolution up to 8192×4320 and may have a frame rate up to 120 fps (frames per second). Hence, entropy decoding is one of the critical performance bottleneck of video processing at the video decoder. Thus, there is a need for an innovative entropy decoding design with improved entropy decoding performance.

SUMMARY

One of the objectives of the claimed invention is to provide a syntax parsing apparatus with multiple syntax parsing circuits for processing multiple image regions (e.g., tiles or slices) within the same frame or processing multiple frames and a related syntax parsing method.

According to a first aspect of the present invention, an exemplary syntax parsing apparatus is disclosed. The exemplary syntax parsing apparatus includes a plurality of syntax parsing circuits and a dispatcher. Each of the syntax parsing circuits has at least entropy decoding capability. The syntax parsing circuits are arranged to generate a plurality of entropy decoding results of a plurality of image regions within a same frame, respectively. The dispatcher is arranged to assign bitstream start points of the image regions to the syntax parsing circuits and trigger the syntax parsing circuits to start entropy decoding, respectively.

According to a second aspect of the present invention, an exemplary syntax parsing apparatus is disclosed. Each of the syntax parsing circuits has at least entropy decoding capability. The syntax parsing circuits are arranged to generate a plurality of entropy decoding results of a plurality of frames, respectively. The dispatcher is arranged to assign bitstream start points of the frames to the syntax parsing circuits and trigger the syntax parsing circuits to start entropy decoding, respectively.

According to a third aspect of the present invention, an exemplary syntax parsing method is disclosed. The exemplary syntax parsing method includes: utilizing a plurality of syntax parsing circuits, each having at least entropy decoding capability, to generate a plurality of entropy decoding results of a plurality of image regions within a same frame, respectively; and assigning bitstream start points of the image regions to the syntax parsing circuits and triggering the syntax parsing circuits to start entropy decoding, respectively.

According to a fourth aspect of the present invention, an exemplary syntax parsing method is disclosed. The exemplary syntax parsing method includes: utilizing a plurality of syntax parsing circuits, each having at least entropy decoding capability, to generate a plurality of entropy decoding results of a plurality of frames, respectively; and assigning bitstream start points of the frames to the syntax parsing circuits and triggering the syntax parsing circuits to start entropy decoding, respectively.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
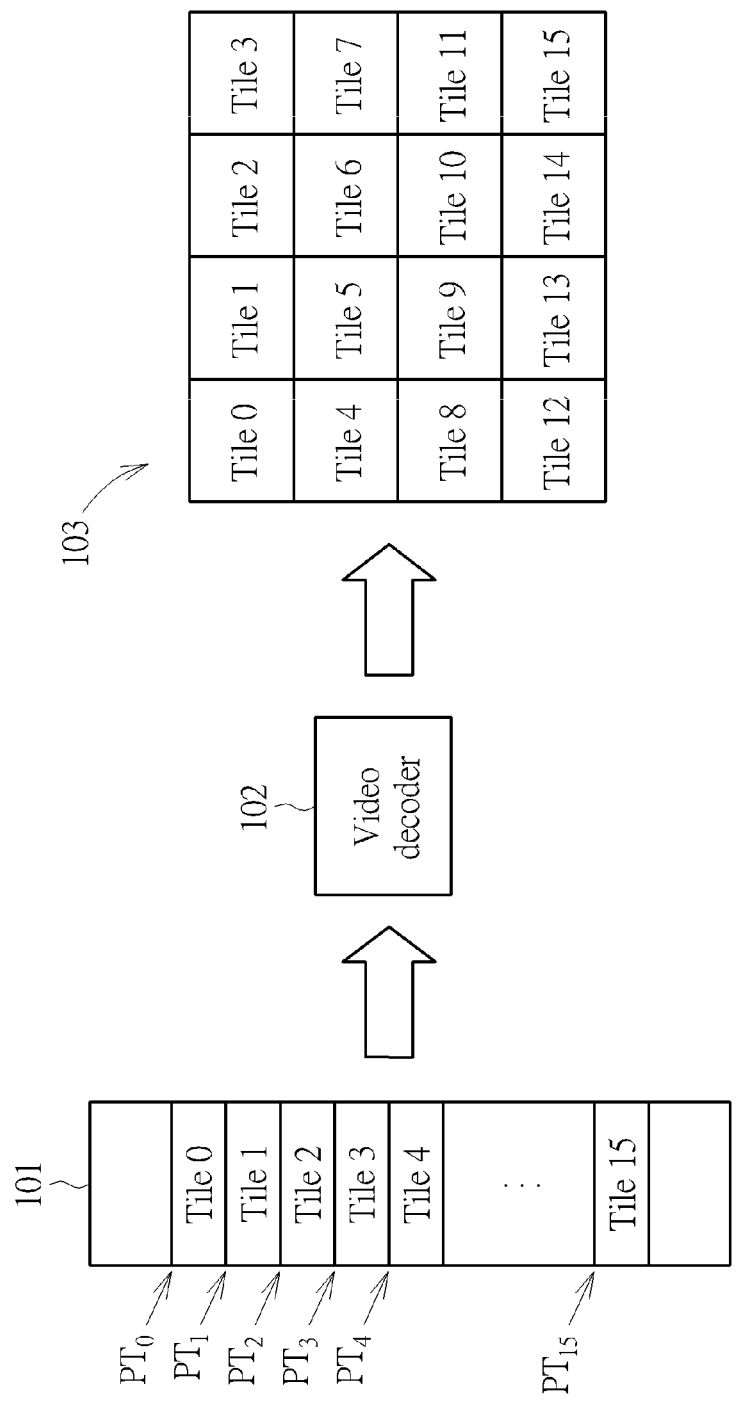
FIG. 1 is a diagram illustrating one decoding operation of a frame divided into a plurality of image regions (e.g., tiles) according to an embodiment of the present invention.

FIG. 1 is a diagram illustrating one decoding operation of a frame divided into a plurality of image regions according to an embodiment of the present invention. At the encoder end, one frame may be divided into a plurality of image regions (e.g., tiles), and the image regions may be encoded. At the decoder end, the image regions may be decoded to reconstruct one frame. As shown in FIG. 1, one frame 103 decoded by a video decoder 102 may include a plurality of image regions such as tiles Tile 0-Tile 15. It should be noted that the sizes of the tiles and the number of the tiles are for illustrative purposes, and are not meant to be limitations of the present invention. Bitstream data (i.e., encoded data) of the tiles Tile 0-Tile 15 may be stored in a bitstream buffer 101. As shown in FIG. 1, a bitstream start point $PT_i$ indicates a memory address offset of the bitstream data (i.e., encoded data) of the tile Tilei stored in the bitstream buffer 101, wherein $0 \le i \le 15$. For example, a bitstream start point $PT_0$ indicates a memory address offset of the bitstream data (i.e., encoded data) of the tile Tile 0 stored in the bitstream buffer 101, and a bitstream start point $PT_{15}$ indicates a memory address offset of the bitstream data (i.e., encoded data) of the tile Tile 15 stored in the bitstream buffer 101. In this embodiment, the video decoder 102 may be configured to employ the proposed parallel processing architecture to decode bitstream data (i.e., encoded data) of multiple tiles.

Figure 2:
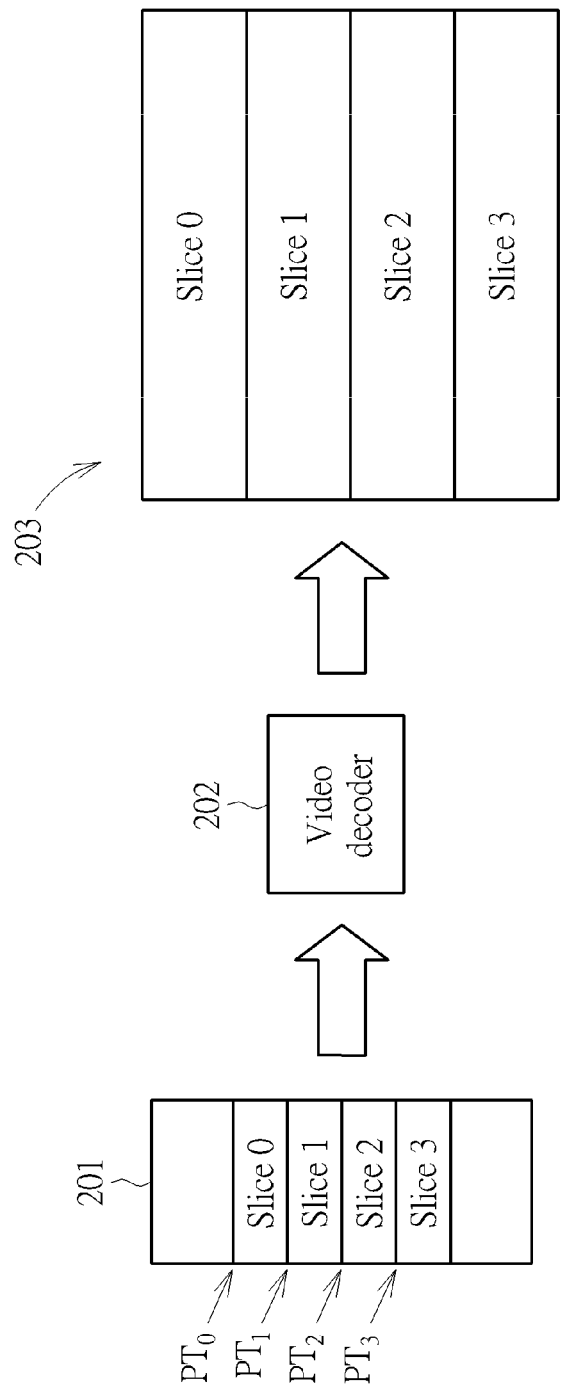
FIG. 2 is a diagram illustrating another decoding operation of a frame divided into a plurality of image regions (e.g., slices) according to an embodiment of the present invention.

FIG. 2 is a diagram illustrating another decoding operation of a frame divided into a plurality of image regions according to an embodiment of the present invention. At the encoder end, one frame may be divided into a plurality of image regions (e.g., slices), and the image regions may be encoded. At the decoder end, the image regions may be decoded to reconstruct one frame. As shown in FIG. 2, one frame 203 decoded by a video decoder 202 may include a plurality of image regions such as slices Slice 0-Slice 3. It should be noted that the sizes of the slices and the number of the slices are for illustrative purposes, and are not meant to be limitations of the present invention. Bitstream data (i.e., encoded data) of the slices Slice 0-Slice 3 may be stored in a bitstream buffer 201. As shown in FIG. 2, a bitstream start point $PT_j$ indicates a memory address offset of the bitstream data (i.e., encoded data) of the slice Slicej stored in the bitstream buffer 201, where $0 \le j \le 3$. For example, a bitstream start point $PT_0$ indicates a memory address offset of the bitstream data (i.e., encoded data) of the slice Slice0 stored in the bitstream buffer 201, and a bitstream start point $PT_3$ indicates a memory address offset of the bitstream data (i.e., encoded data) of the slice Slice 3 stored in the bitstream buffer 201. In this embodiment, the video decoder 202 may be configured to employ the proposed parallel processing architecture to decode bitstream data (i.e., encoded data) of multiple slices.

Figure 3:
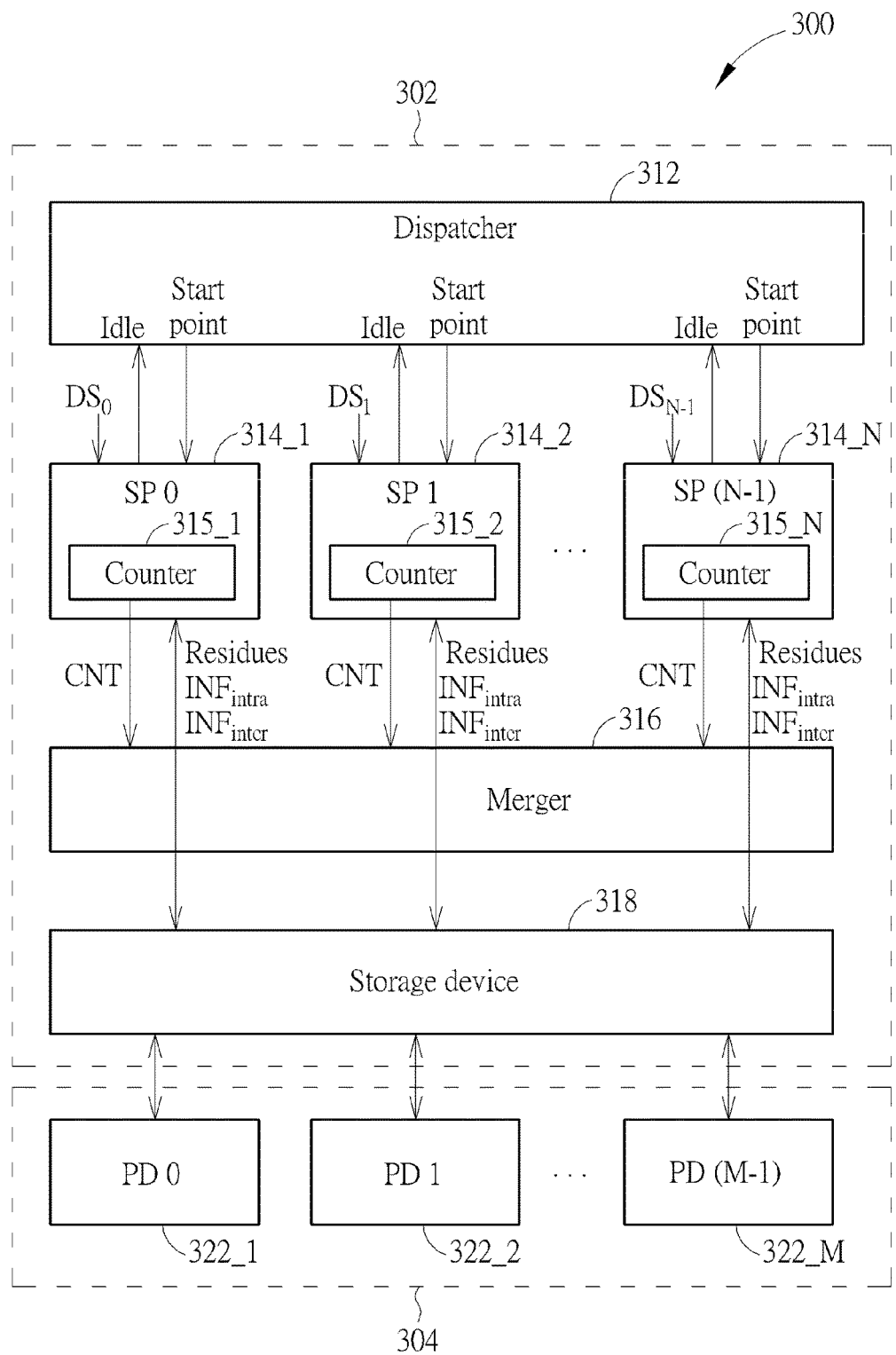
FIG. 3 is a diagram illustrating a video decoder according to a first embodiment of the present invention.

FIG. 3 is a diagram illustrating a video decoder according to a first embodiment of the present invention. For example, the video decoder 102/202 may be implemented using the video decoder 300 shown in FIG. 3. The video decoder 300 includes a syntax parsing apparatus 302 and a post decoding apparatus 304. The syntax parsing apparatus 302 includes a dispatcher 312, a plurality of syntax parsing circuits (denoted by SP 0, SP 1, . . . , SP (N−1)) 314_1-314_N, a merger 316, and a storage device 318. The post decoding apparatus 304 includes a plurality of post decoding circuits (denoted by PD 0, PD 1, . . . , PD (M−1)) 322_1-322_M. The values of N and M may be any positive integers larger than one. The value of N may be equal to or different from the value of M, depending upon actual design consideration.

VP9 is an open and royalty-free video coding standard being developed by Google®. For clarity and simplicity, it is assumed that the video decoder 300 is arranged to perform video decoding upon a bitstream compliant with a VP9 coding standard or any other standard which would update probabilities (e.g., between frames). However, this is for illustrative purposes only, and is not meant to be a limitation of the present invention. Any video decoder using the proposed syntax parsing apparatus falls within the scope of the present invention.

Each of the syntax parsing circuits 314_1-314_N has entropy decoding capability. The syntax parsing circuits 314_1-314_N are arranged to decode bitstream data (i.e., encoded data) $DS_0$-$DS_{N-1}$ of image regions (e.g., tiles or slices) within the same frame to generate entropy decoding results, each including residues and prediction mode information (e.g., intra mode information $INF_{intra}$ or inter mode information $INF_{inter}$). In addition, the syntax parsing circuits 314_1-314_N have counters 315_1-315_N, respectively. Each of the counters 315_1-315_N is arranged to calculate counts of each symbol decoded by a corresponding syntax parsing circuit.

Figure 4:
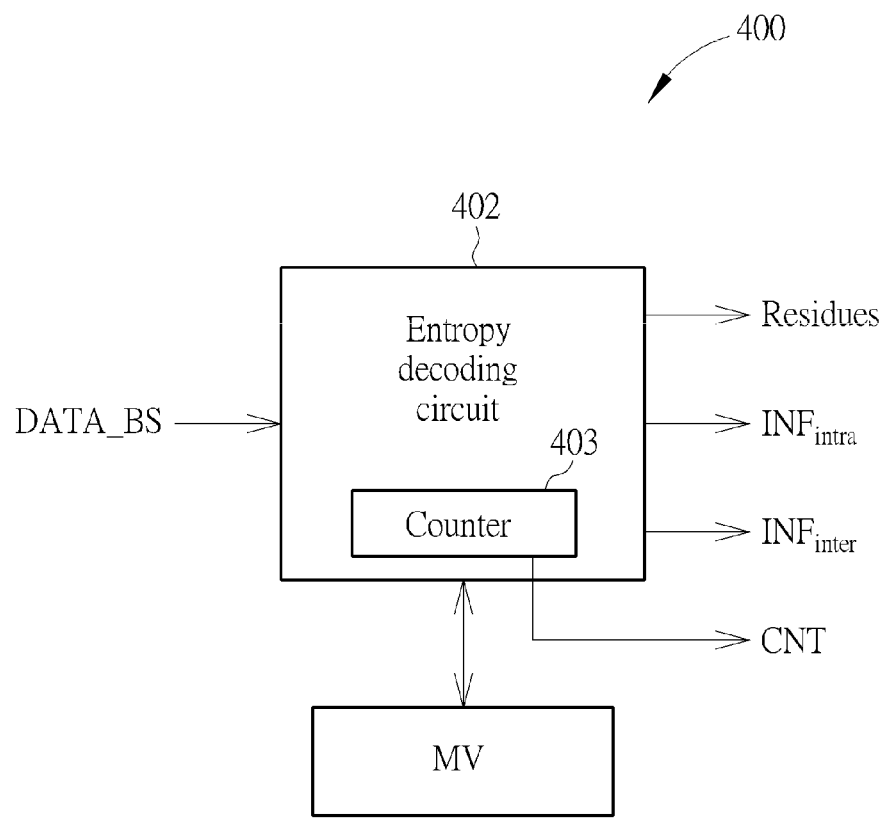
FIG. 4 is a diagram illustrating one exemplary implementation of a syntax parsing circuit according to an embodiment of the present invention.

FIG. 4 is a diagram illustrating one exemplary implementation of a syntax parsing circuit according to an embodiment of the present invention. Each of the syntax parsing circuits 314_1-314_N may be implemented using the syntax parsing circuit 400 shown in FIG. 4. The syntax parsing circuit 400 includes an entropy decoding circuit 402 for performing entropy decoding upon a bitstream data DATA_BS of an image region (e.g., tile or slice) to generate an entropy decoding result. In accordance with the VP9 coding standard, the syntax parsing circuit 400 may refer to the motion vector (MV) of a neighbor processing unit (i.e., neighbor superblock) to decode a motion vector difference (MVD) of a current processing unit (e.g., current superblock). Further, the entropy decoding circuit 402 has a counter 403 included therein. The counter 403 is arrange to count symbols decoded by the entropy decoding circuit 402 and accordingly generate count data CNT used for backward adaptation of probabilities that may be referenced for decoding processing units (e.g., superblocks) in the next frame.

Figure 5:
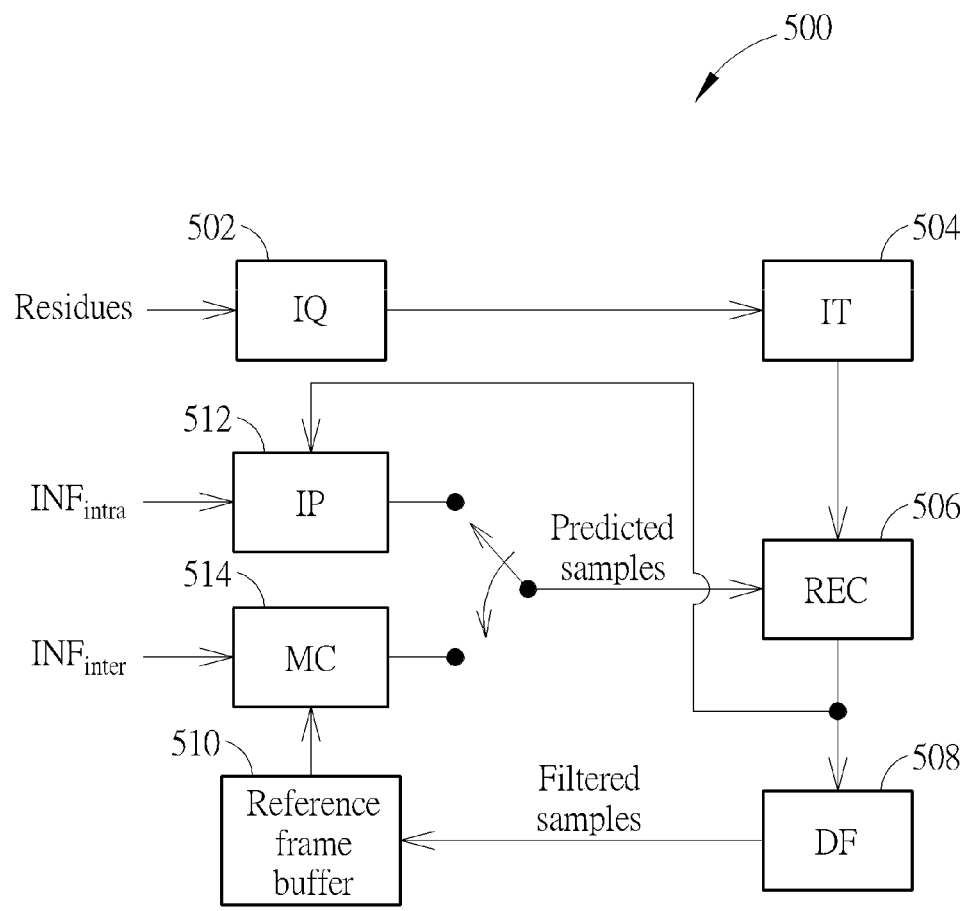
FIG. 5 is a diagram illustrating one exemplary implementation of a post decoding circuit according to an embodiment of the present invention.

Each of the post decoding circuits 322_1-322_M shown in FIG. 3 is arranged to generate a partial reconstructed frame according to the entropy decoding result generated from at least one syntax parsing circuit. FIG. 5 is a diagram illustrating one exemplary implementation of a post decoding circuit according to an embodiment of the present invention. Each of the post decoding circuits 322_1-322_M may be implemented using the post decoding circuit 500 shown in FIG. 5. The post decoding circuit 500 may include at least some of an inverse quantization circuit (denoted as "IQ") 502, an inverse transform circuit (denoted as "IT") 504, a reconstruction circuit (denoted as "REC") 506, at least one in-loop filter (e.g., a deblocking filter (DF) 508), a reference frame buffer 510, an intra prediction circuit (denoted as "IP") 512, and a motion compensation circuit (denoted as "MC") 514. The reference frame buffer 510 may be an external storage device such as an off-chip dynamic random access memory (DRAM). The residues generated from the entropy decoding circuit 402 of the syntax parsing circuit 400 may be transmitted to the reconstruction circuit 506 after processed by the inverse quantization circuit 502 and the inverse transform circuit 504. When an image region (e.g., tile or slice) is encoded in the intra prediction mode, the intra prediction circuit 512 may process the intra prediction information generated from the entropy decoding circuit 402 of the syntax parsing circuit 400 to output predicted samples to the reconstruction circuit 506. When an image region (e.g., tile or slice) is encoded in the inter prediction mode, the motion compensation circuit 514 may process the inter prediction information generated from the entropy decoding circuit 402 of the syntax parsing circuit 400 to output predicted samples to the reconstruction circuit 506. A reconstructed frame is generated at the reconstruction circuit 506. In addition, the reconstructed frame is processed by the de-blocking filter 504, such that a de-blocked frame is stored into the reference frame buffer 510 to serve as a reference frame. As a person skilled in the pertinent art can readily understand details of each functional block shown in FIG. 5, further description is omitted here for brevity.

The use of multiple syntax parsing circuits 314_1-314_N enables parallel syntax parsing of multiple image regions within the same frame (e.g., multiple tiles that will be decoded to reconstruct the same frame 103 shown in FIG. 1 or multiple slices that will be decoded to reconstruct the same frame 203 shown in FIG. 2). In addition, the use of multiple post decoding circuits 322_1-322_M enables parallel post decoding of multiple image regions within the same frame (e.g., multiple tiles within the same frame 103 shown in FIG. 1 or multiple slices within the same frame 203 shown in FIG. 2). With regard to the proposed syntax parsing apparatus 302, the dispatcher 312 is arranged to assign bitstream start points of the image regions (e.g., tiles or slices) to the syntax parsing circuits 314_1-314_N, respectively, and is further arranged to trigger the syntax parsing circuits 314_1-314_N to start entropy decoding, respectively. For example, the dispatcher 312 may calculate a location of a start processing unit (PU) of a not-yet-decoded image region within a frame, check if the syntax parsing circuits 314_1-314_N have any idle syntax parsing circuit, and check if spatial reference data of the not-yet-decoded image region is ready. Hence, the dispatcher 312 can assign a bitstream start point of the not-yet-decoded image region to an idle syntax parsing circuit and trigger the idle syntax parsing circuit to start entropy decoding when the idle syntax parsing circuit is found in the syntax parsing circuits 314_1-314_N and the spatial reference data of the not-yet-decoded image region is ready.

Figure 6:
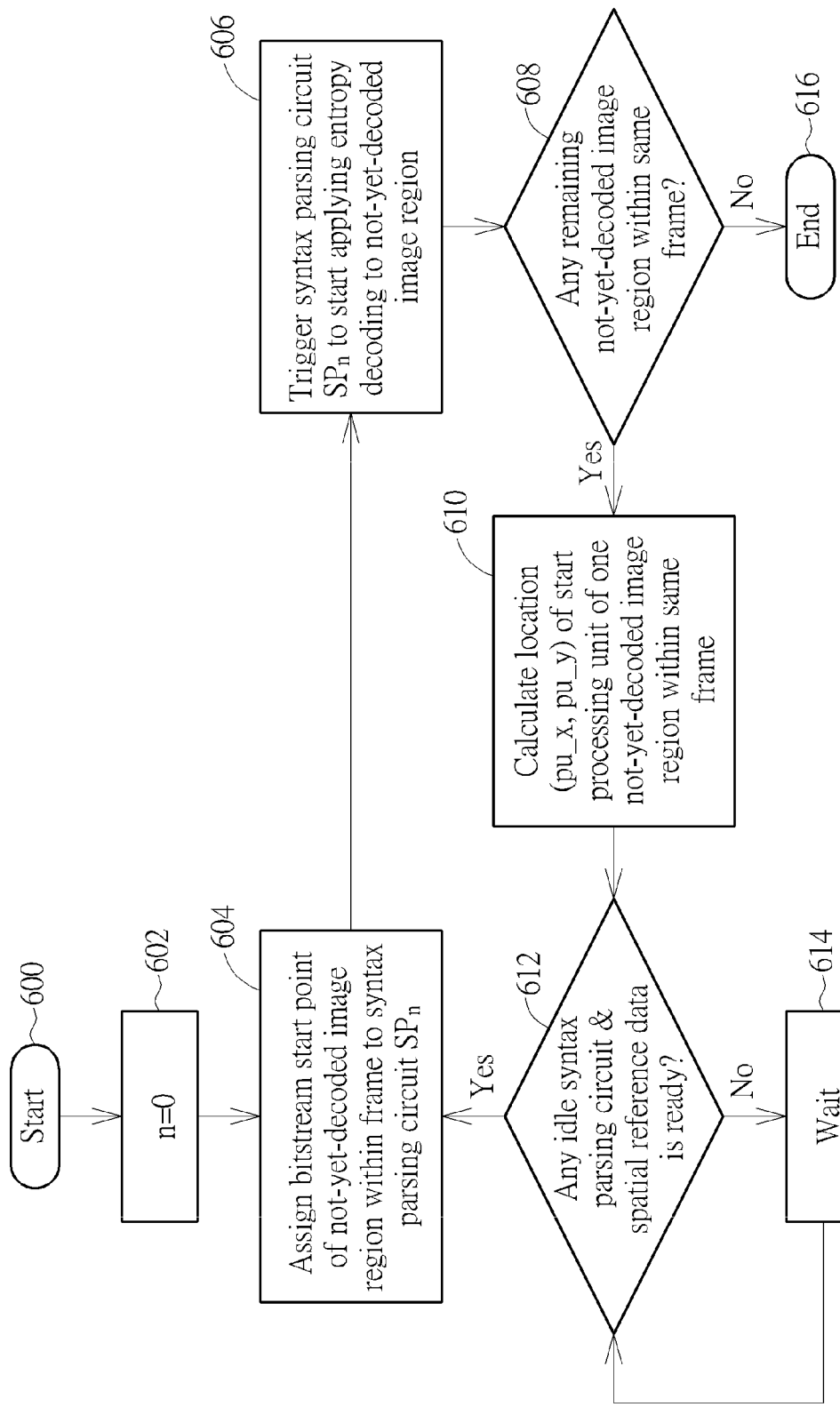
FIG. 6 is a flowchart illustrating a control flow of a dispatcher shown in FIG. 3 according to an embodiment of the present invention.

FIG. 6 is a flowchart illustrating a control flow of the dispatcher 312 shown in FIG. 3 according to an embodiment of the present invention. Provided that the result is substantially the same, the steps are not required to be executed in the exact order shown in FIG. 6. In addition, one or more steps may be added to or removed from the control flow shown in FIG. 6. The control flow of the dispatcher 312 may be briefly summarized as below.

Step 600: Start.
Step 602: set n=0.
Step 604: Assign a bitstream start point of a not-yet-decoded image region (e.g., not-yet-decoded tile or not-yet-decoded slice) within a frame to the syntax parsing circuit $SP_n$.
Step 606: Trigger the syntax parsing circuit $SP_n$ to start applying entropy decoding to the not-yet-decoded image region.
Step 608: Check if there is any remaining not-yet-decoded image region within the same frame. If yes, go to step 610; otherwise, go to step 616.
Step 610: Calculate a location (pu_x, pu_y) of a start processing unit (PU) of one not-yet-decoded image region within the same frame.
Step 612: Check if there is any idle syntax parsing circuit and the spatial reference data of the not-yet-decoded image region is ready. If yes, go to step 604; otherwise, go to step 614.
Step 614: Wait for availability of an idle syntax parsing circuit and the spatial reference data of the not-yet-decoded image. Go to step 612.
Step 616: End.

By way of example, but not limitation, the operation of step 612 may be expressed using the following pseudo codes.

```
for (n=0;n<N;n++){
    If (SPn idle && PU spatial reference data is ready?)
    goto Yes;
    else{
    goto No;
    }
```

Further, a bitstream start point of a not-yet-decoded image region in step 604 may be obtained by an inquiry means (e.g., a look-up table) or a computation means (e.g., an exemplary calculation algorithm used in step 610). However, this is for illustrative purposes only, and is not meant to be a limitation of the present invention.

After dispatching a bitstream start point of one not-yet-decoded image region to an idle syntax parsing circuit at the beginning of entropy decoding of a frame, the dispatcher 312 will find another idle syntax parsing circuit and dispatches a bitstream start point of another not-yet-decoded image region to the found idle syntax parsing circuit. In accordance with the advanced video coding standard such as VP9, adjacent tiles in the vertical direction have dependency. That is, entropy decoding of a current tile requires information of an adjacent tile above the current tile. Hence, if any one of the syntax parsing circuits 314_1-314_N becomes idle and there is at least one not-yet-decoded image region within the frame, the dispatcher 312 is operative to dispatch a bitstream start point of a not-yet-decoded image region to an idle syntax parsing circuit and then trigger the idle syntax parsing circuit to start entropy decoding. In this way, parallel syntax parsing of multiple image regions within the same frame can be achieved. For example, the syntax parsing circuits 314_1-314_N include a first syntax parsing circuit and a second syntax parsing circuit. The first syntax parsing circuit is arranged to perform entropy decoding upon a first image region within a frame during a first processing time period, and the second syntax parsing circuit is arranged to perform entropy decoding upon a second image region within the same frame during a second processing time period, where the second processing time period is overlapped with the first processing time period.

As mentioned above, the count data CNT generated from the counters 315_1-315_N included in the syntax parsing circuits 314_1-314_N will be used for backward adaptation of probabilities that may be referenced for entropy decoding of the next frame. Except for very few header bits that are encoded directly as raw values, the majority of compressed VP9 data values are encoded using a boolean arithmetic encoder acting as the underlying binary arithmetic encoder. Generally speaking, given a symbol from any n-ary alphabet, a static binary tree is constructed with (n−1) non-leaf nodes (or called parent nodes) and (n) leaf nodes, and the binary arithmetic encoder operates on each non-leaf node as the tree is traversed to encode a particular symbol.

Figure 7:
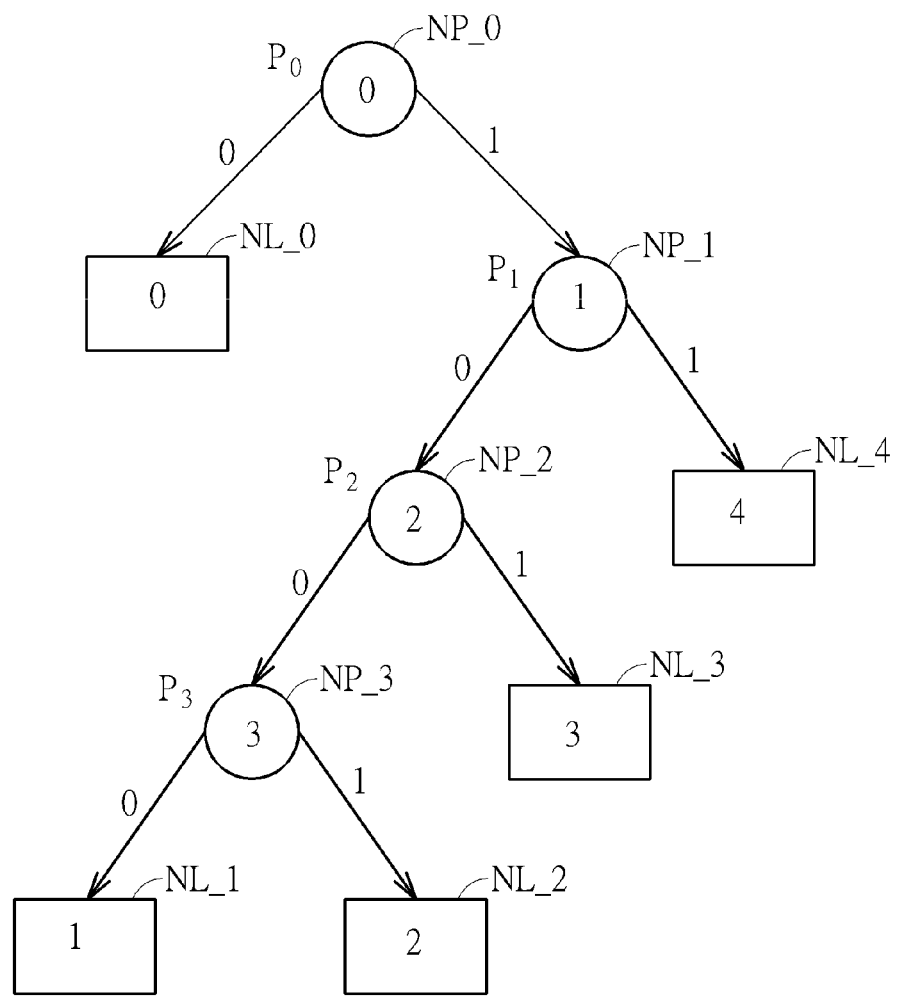
FIG. 7 is a diagram illustrating a binary tree created for a set of symbols according to an embodiment of the present invention.

FIG. 7 is a diagram illustrating a binary tree created for a set of symbols according to an embodiment of the present invention. In this example, there are 4 non-leaf nodes NP_0, NP_1, NP_2, NP_3 represented by circles, and 5 leaf nodes NL_0, NL_1, NL_2, NL_3, NL_4 represented by squares. Any symbol in the alphabet can be represented by a series of binary values generated by traversing the binary tree from the root node NP_0 to a corresponding leaf node. Each non-leaf node in the binary tree has a probability (e.g., $P_0$, $P_1$, $P_2$, $P_3$) assigned on the basis of the likelihood of taking the left (0) branch for traversing. The set of probabilities $P_0$-$P_3$ for encoding possible symbols of a specific syntax is referred to as an entropy coding context (or called probability model) of the specific syntax. The video content is inherently non-stationary in nature and a critical element of any video encoder/decoder is the mechanism used to track the statistics of various symbols and update the entropy coding contexts (probability models) of symbols in the probability table to match the actual distribution of the symbols. For example, backward adaptation may be employed to update entropy coding contexts (probability models) at the end of encoding/decoding each frame. In other words, once all symbols in a frame have been processed (e.g., encoded or decoded), a backward adaptation step is conducted to further update the probabilities for use in the next frame according to actual counts for each symbol in the frame. Based on these actual counts, probabilities of various non-leaf nodes in a corresponding binary tree can be obtained. Take the binary tree shown in FIG. 7 as an example. For each of the non-leaf nodes NP_0-NP_3, one count data is generated to indicate the number of occurrence times of 0's, and the other count data is generated to indicate the number of occurrence times of 1's. Hence, based on count data of all non-leaf nodes NP_0-NP_3, new values of the set of probabilities $P_0$-$P_3$ can be obtained and then used by the backward adaptation step to set updated values of the set of probabilities $P_0$-$P_3$ that may be selected for encoding/decoding the next frame.

In this embodiment, the merger 316 is arranged to update a count table according to count data CNT generated from counters 315_1-315_N of the syntax parsing circuits 314_1-314_N. For example, the merger 316 may refer to the count data CNT generated from the counters 315_1-315_N for merging counts of the same symbol. At the end of entropy decoding of the frame, a count table is maintained by the merger 316, and then referenced for backward adaptation of probabilities.

The storage device 318 is shared by the syntax parsing circuits 314_1-314_N for storing the entropy decoding results of different image regions within the same frame. In addition, count data CNT generated from counters 315_1-315_N may be stored in the same storage device 318. However, this is for illustrative purposes only, and is not meant to be a limitation of the present invention.

Figure 8:
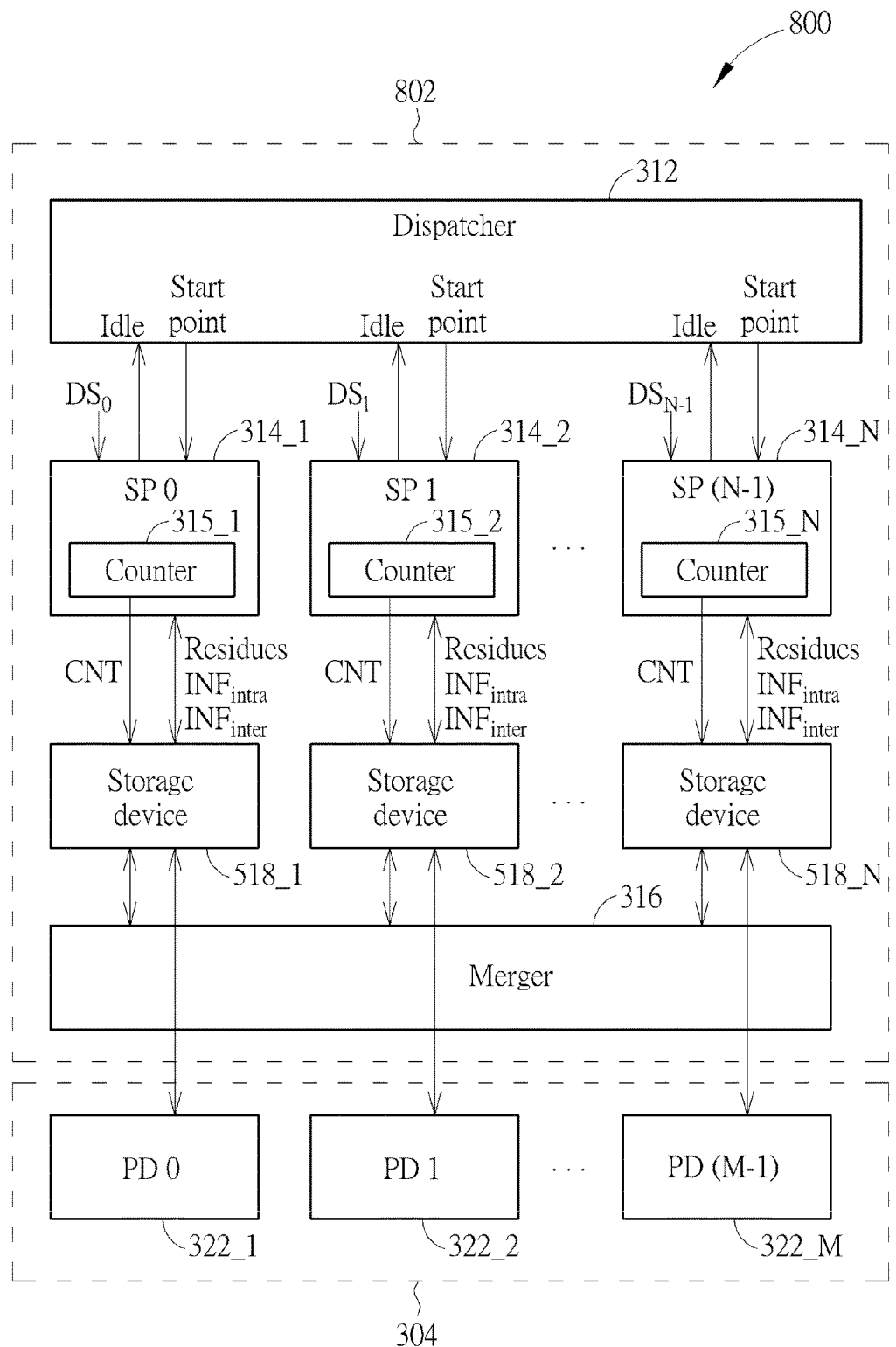
FIG. 8 is a diagram illustrating a video decoder according to a second embodiment of the present invention.

FIG. 8 is a diagram illustrating a video decoder according to a second embodiment of the present invention. For example, the video decoder 102/202 may be implemented using the video decoder 800 shown in FIG. 8. The major difference between the video decoders 300 and 800 is that the syntax parsing apparatus 802 of the video decoder 800 has a plurality of storage devices 518_1-518_N dedicated to the syntax parsing circuits 314_1-314_N, respectively. Hence, the storage devices 518_1-518_N are arranged to store the entropy decoding results of the image regions processed by the syntax parsing circuits 314_1-314_N, respectively. For example, each of the storage devices 518_1-518_N is used to store an entropy decoding result generated from a corresponding syntax parsing circuit only. In addition, the count data CNT generated from each of the counters 315_1-315_N included in the syntax parsing circuits 314_1-314_N is stored into a corresponding storage device only. Since each of the storage devices 518_1-518_N is not shared by different syntax parsing circuits and adjacent tiles in the vertical direction has dependency, each of the syntax parsing circuits 314_1-314_N is arranged to perform entropy decoding upon tiles of the same column in the same frame.

In this embodiment, the merger 316 reads the count data CNT generated by the counters 315_1-315_N from the storage devices 518_1-518_N, and refers to the count data CNT for merging counts of the same symbol. At the end of entropy decoding of the frame, a count table is maintained by the merger 316, and then referenced for backward adaptation of probabilities. Further, each of the post decoding circuits 322_1-322_M is arranged to generate a partial reconstructed frame according to the entropy decoding result stored in at least one of the storage devices 518_1-518_N. For example, one storage device may be accessed by one or more post decoding circuits, and/or one post decoding circuit may be configured to access one or more storage devices. In some other embodiments, the numbers of the syntax parsing circuits, the storage devices and the post decoding circuits may be adjusted, and the connections between them may be adjusted correspondingly, which should not be limited in this disclosure.

Each of the aforementioned video decoders 300 and 800 may be configured to perform tile-level/slice-level parallel entropy decoding by using multiple syntax parsing circuits. However, the same concept of using multiple syntax parsing circuits may be employed by a video decoder for achieving frame-level parallel entropy decoding.

Figure 9:
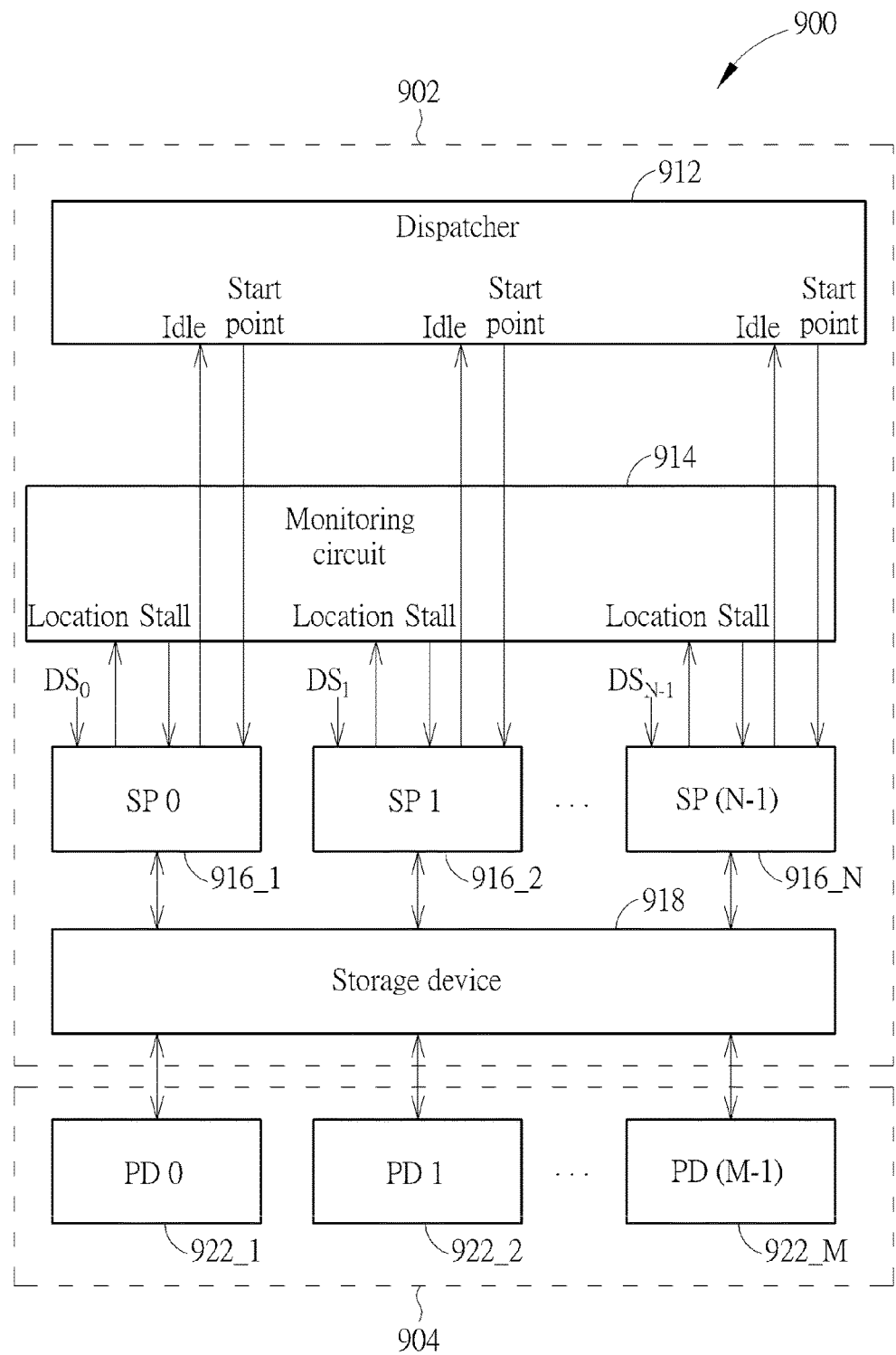
FIG. 9 is a diagram illustrating a video decoder according to a third embodiment of the present invention.

FIG. 9 is a diagram illustrating a video decoder according to a third embodiment of the present invention. The video decoder 900 includes a syntax parsing apparatus 902 and a post decoding apparatus 904. The syntax parsing apparatus 902 includes a dispatcher 912, a monitoring circuit 914, a plurality of syntax parsing circuits (denoted by SP 0, SP 1, . . . , SP (N−1)) 916_1-916_N, and a storage device 918. The post decoding apparatus 904 includes a plurality of post decoding circuits (denoted by PD 0, PD 1, . . . , PD (M-1)) 922_1-922_M. The values of N and M may be any positive integers larger than one. The value of N may be equal to or different from the value of M, depending upon actual design consideration.

As mentioned above, VP9 is an open and royalty-free video coding standard being developed by Google®. For clarity and simplicity, it is assumed that the video decoder 900 is arranged to perform video decoding upon a bitstream compliant with a VP9 coding standard. However, this is for illustrative purposes only, and is not meant to be a limitation of the present invention. Any video decoder using the proposed syntax parsing apparatus falls within the scope of the present invention. In addition, it is assumed that the backward adaptation of probabilities is not required for successive frames decoded by the video decoder 900.

Frame-level parallel entropy decoding can be achieved by the syntax parsing apparatus 902. In this embodiment, each of the syntax parsing circuits 916_1-916_N has entropy decoding capability. The syntax parsing circuits 916_1-916_N are arranged to decode bitstream data (i.e., encoded data) $DS_0$-$DS_{N-1}$ of different frames and generate entropy decoding results of the different frames, respectively. Each of the entropy decoding results may include residues and prediction mode information (e.g., intra mode information or inter mode information). The frame-level information of different frames (i.e., entropy decoding results of different frames) are generated from the syntax parsing circuits 916_1-916_N, and then stored into the storage device 918.

Each of the post decoding circuits 922_1-922_M is arranged to generate a reconstructed frame according to the entropy decoding result generated from one of the syntax parsing circuits 916_1-916_N and stored in the storage device 918. For example, each of the post decoding circuits 922_1-922_M may be implemented using the post decoding circuit 500 shown in FIG. 5 for generating a reconstructed frame.

The use of multiple syntax parsing circuits 916_1-916_N enables parallel syntax parsing of multiple frames. In addition, the use of multiple post decoding circuits 922_1-922_M enables parallel post decoding of multiple frames. Like the bitstream data of tiles/slices shown in FIG. 1/FIG. 2, bitstream data of different frames may be stored in a bitstream buffer, where a bitstream start point indicates a memory address offset of the bitstream data (i.e., encoded data) of one frame stored in the bitstream buffer. With regard to the proposed syntax parsing apparatus 902, the dispatcher 912 is arranged to assign bitstream start points of different frames to the syntax parsing circuits 916_1-916_N, respectively, and is further arranged to trigger the syntax parsing circuits 916_1-914_N to start entropy decoding, respectively. For example, the dispatcher 912 may check if the syntax parsing circuits 916_1-916_N have any idle syntax parsing circuit, and may assign a bitstream start point of a not-yet-decoded image region to an idle syntax parsing circuit and trigger the idle syntax parsing circuit to start entropy decoding when the idle syntax parsing circuit is found in the syntax parsing circuits 916_1-916_N.

Figure 10:
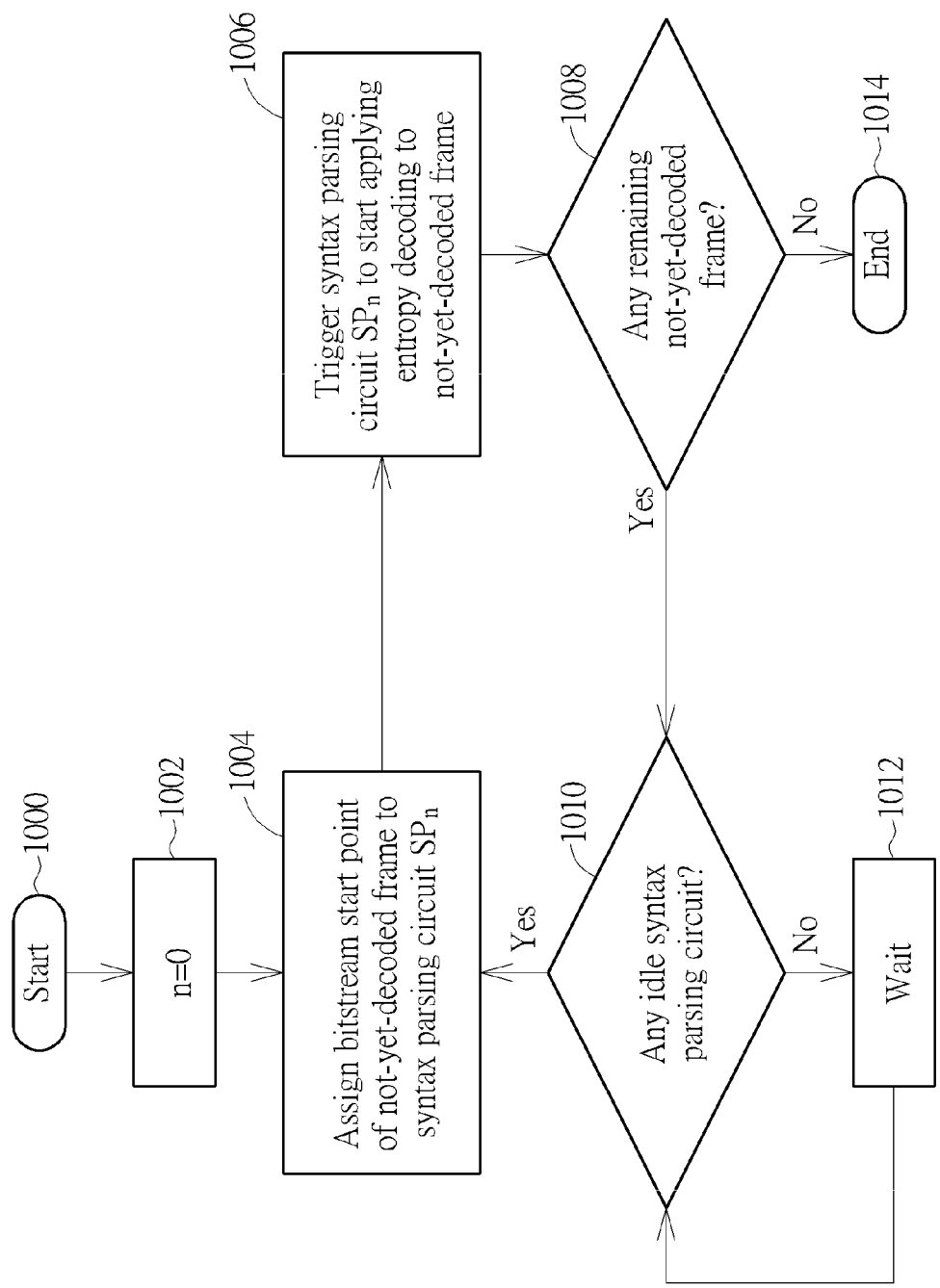
FIG. 10 is a flowchart illustrating a control flow of a dispatcher shown in FIG. 9 according to an embodiment of the present invention.

FIG. 10 is a flowchart illustrating a control flow of the dispatcher 912 shown in FIG. 9 according to an embodiment of the present invention. Provided that the result is substantially the same, the steps are not required to be executed in the exact order shown in FIG. 10. In addition, one or more steps may be added to or removed from the control flow shown in FIG. 10. The control flow of the dispatcher 912 may be briefly summarized as below.

Step 1000: Start.
Step 1002: set n=0.
Step 1004: Assign a bitstream start point of a not-yet-decoded frame to the syntax parsing circuit $SP_n$.
Step 1006: Trigger the syntax parsing circuit $SP_n$ to start applying entropy decoding to the not-yet-decoded frame.
Step 1008: Check if there is any remaining not-yet-decoded frame. If yes, go to step 1010; otherwise, go to step 1014.
Step 1010: Check if there is any idle syntax parsing circuit. If yes, go to step 1004; otherwise, go to step 1012.
Step 1012: Wait for availability of an idle syntax parsing circuit. Go to step 1010. Step 1014: End.

By way of example, but not limitation, the operation of step 1010 may be expressed using the following pseudo codes.

```
for (n=0;n<N;n++){
    If (SP_n idle)
    goto Yes;
    else{
    goto No;
    }
```

After dispatching a bitstream start point of one not-yet-decoded frame to an idle syntax parsing circuit, the dispatcher 912 will find another idle syntax parsing circuit and dispatch a bitstream start point of another not-yet-decoded frame to the found idle syntax parsing circuit. Hence, if any one of the syntax parsing circuits 916_1-916_N becomes idle and there is at least one not-yet-decoded frame, the dispatcher 912 is operative to dispatch a bitstream start point of a not-yet-decoded frame to an idle syntax parsing circuit and then trigger the idle syntax parsing circuit to start entropy decoding. In this way, parallel syntax parsing of multiple frames can be achieved. For example, the syntax parsing circuits 916_1-916_N include a first syntax parsing circuit and a second syntax parsing circuit. The first syntax parsing circuit is arranged to perform entropy decoding upon a first frame during a first processing time period, and the second syntax parsing circuit is arranged to perform entropy decoding upon a second frame during a second processing time period, wherein the second processing time period is overlapped with the first processing time period.

The processing units in different frames may have temporal dependency. For example, the entropy decoding of one processing unit in a first frame may require information of one processing unit co-located in a second frame preceding the first frame. When the temporal reference data required by entropy decoding of a specific processing unit is not available, entropy decoding of the specific processing unit should be stalled until the required temporal reference data is available. In this embodiment, the monitoring circuit 914 is shared by the syntax parsing circuits 916_1-916_N that are used to perform entropy decoding of different frames, and is arranged to monitor availability of temporal reference data required by each of the syntax parsing circuits 916_1-916_N. For example, when temporal reference data required by entropy decoding of a processing unit is not available to a specific syntax parsing circuit, the monitoring circuit 914 stalls the entropy decoding performed by the specific syntax parsing circuit.

Figure 11:
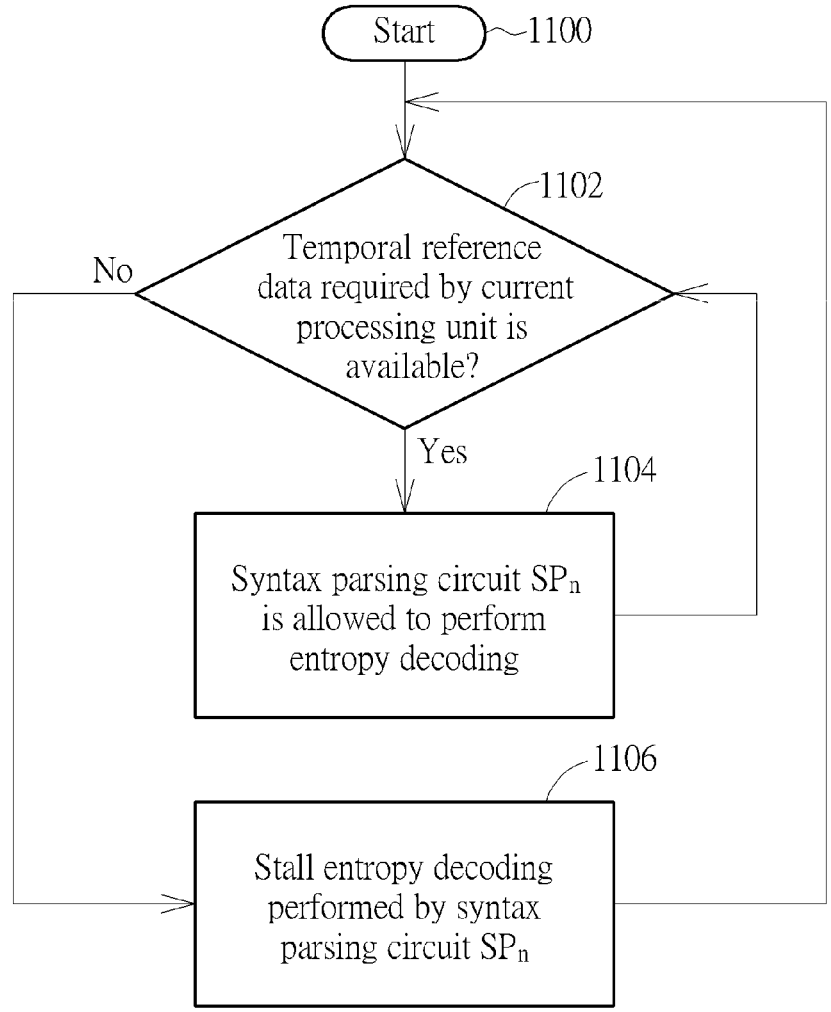
FIG. 11 is a flowchart illustrating a control flow of a monitoring circuit shown in FIG. 9 according to an embodiment of the present invention.

FIG. 11 is a flowchart illustrating a control flow of the monitoring circuit 914 shown in FIG. 9 according to an embodiment of the present invention. Provided that the result is substantially the same, the steps are not required to be executed in the exact order shown in FIG. 11. In addition, one or more steps may be added to or removed from the control flow shown in FIG. 11. The control flow of the monitoring circuit 914 may be briefly summarized as below.

Step 1100: Start.

Step 1102: Monitor a location (pu_x, pu_y) of a current processing unit being decoded by one syntax parsing circuit $SP_n$ for availability of temporal reference data. If the temporal reference data is available, go to step 1104; otherwise, go to step 1106.

Step 1104: The syntax parsing circuit $SP_n$ is allowed to perform entropy decoding. Go to step 1102.

Step 1106: Stall entropy decoding performed by the syntax parsing circuit $SP_n$. Go to step 1102.

By way of example, but not limitation, the operation of step 1102 may be expressed using the following pseudo codes.

```
Previous SP (SP_p):
if (n == 0) SP_p = SP_{N-1};
elseSP_p = SP_{n-1};
    If ( SP_p(pu_x, pu_y) == SP_n(pu_x, pu_y) )
goto No;
else{
goto Yes;
    }
```

In one exemplary design, the syntax parsing circuits 916_1-916_N are sequentially and cyclically used for processing successive frames. For example, if the syntax parsing circuits 916_1 is used to process a second frame, the syntax parsing circuits 916_N is used to process a first frame preceding the second frame. For another example, if the syntax parsing circuits 916_2 is used to process a second frame, the syntax parsing circuits 916_1 is used to process a first frame preceding the second frame. Hence, if the syntax parsing circuit $SP_p$ is still processing a processing unit at a location (pu_x, pu_y) of a previous frame when the syntax parsing circuit $SP_n$ is going to process a co-located processing unit at the same location (pu_x, pu_y) of a current frame, it implies that the temporal reference data required by entropy decoding of the processing unit at the location (pu_x, pu_y) of the current frame is not available yet. In this embodiment, the monitoring circuit 914 is operative to stall the entropy decoding of the processing unit at the location (pu_x, pu_y) until the required temporal reference data is available.

However, if the syntax parsing circuit $SP_p$ is not processing a processing unit at a location (pu_x, pu_y) of a previous frame when the syntax parsing circuit $SP_n$ is going to process a co-located processing unit at the same location (pu_x, pu_y) of a current frame, it implies that the temporal reference data required by entropy decoding of the processing unit at the location (pu_x, pu_y) of the current frame is available. In this embodiment, the monitoring circuit 914 does not stall the entropy decoding of the processing unit at the location (pu_x, pu_y), thus allowing the syntax parsing circuit $SP_n$ to perform entropy decoding upon the processing unit at the location (pu_x, pu_y) of the current frame.

With regard to the exemplary video decoder 900 shown in FIG. 9, the monitoring circuit 914 may be regarded as a centralized controller responsible for monitoring the syntax parsing circuits 916_1-916_N. However, this is for illustrative purposes only, and is not meant to be a limitation of the present invention. Alternatively, each of the syntax parsing circuits 916_1-916_N may be monitored by one dedicated monitoring circuit.

Figure 12:
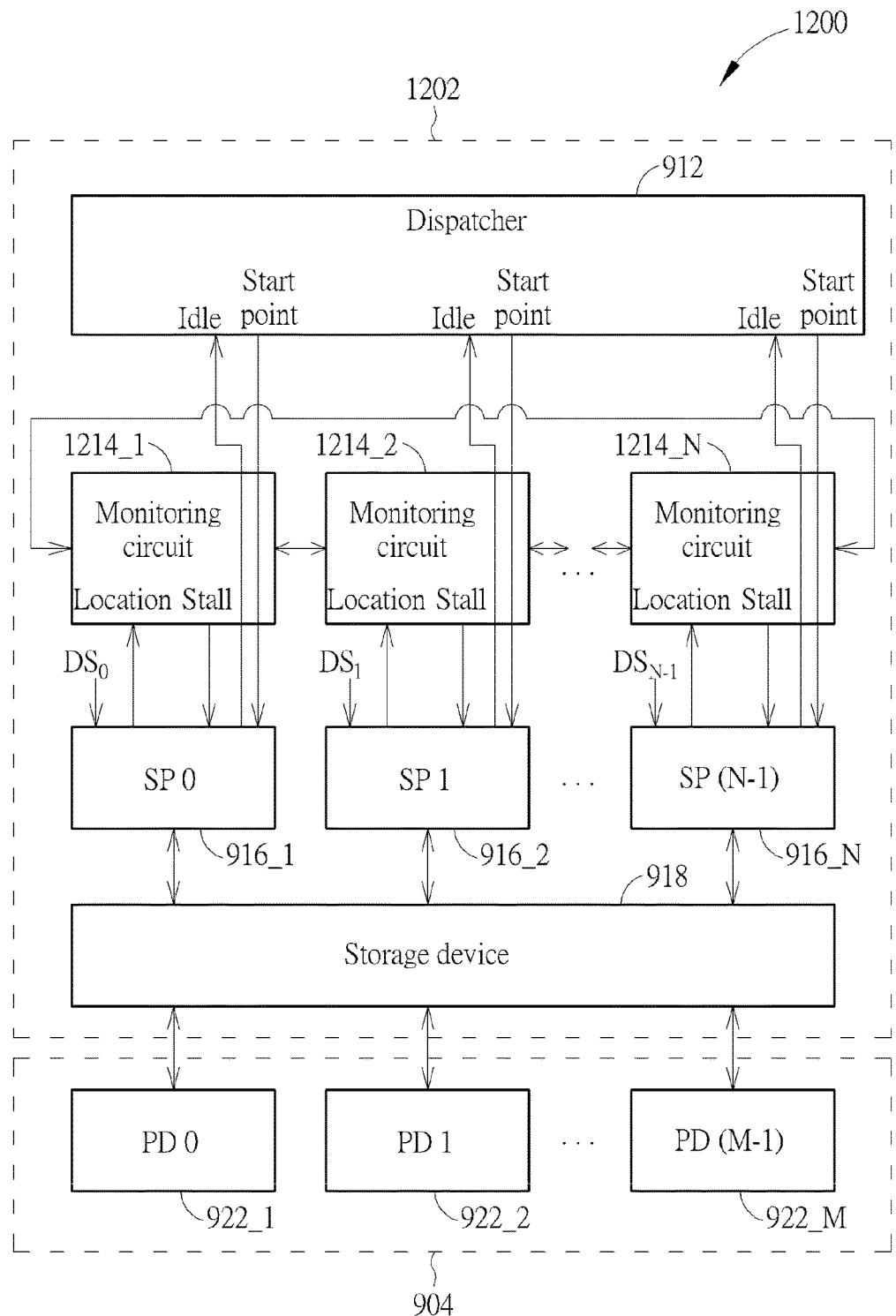
FIG. 12 is a diagram illustrating a video decoder according to a fourth embodiment of the present invention.

FIG. 12 is a diagram illustrating a video decoder according to a fourth embodiment of the present invention. The major difference between the video decoders 900 and 1200 is that the syntax parsing apparatus 1202 of the video decoder 1200 has a plurality of monitoring circuit 1214_1-1214_N dedicated to the syntax parsing circuits 916_1-916_N, respectively. One of the monitoring circuit 1214_1-1214_N may communicate with another of the monitoring circuit 1214_1-1214_N. That is, one monitoring circuit dedicated to one syntax parsing circuit used to perform entropy decoding of a current frame may obtain monitoring information from another monitoring circuit dedicated to another syntax parsing circuit used to perform entropy decoding of a previous frame. Hence, each of the monitoring circuits 1214_1-1214_N can monitor availability of temporal reference data required by a corresponding syntax parsing circuit, and can stall entropy decoding performed by the corresponding syntax parsing circuit when temporal reference data required by the entropy decoding of a processing unit is not available to the corresponding syntax parsing circuit.

Figure 13:
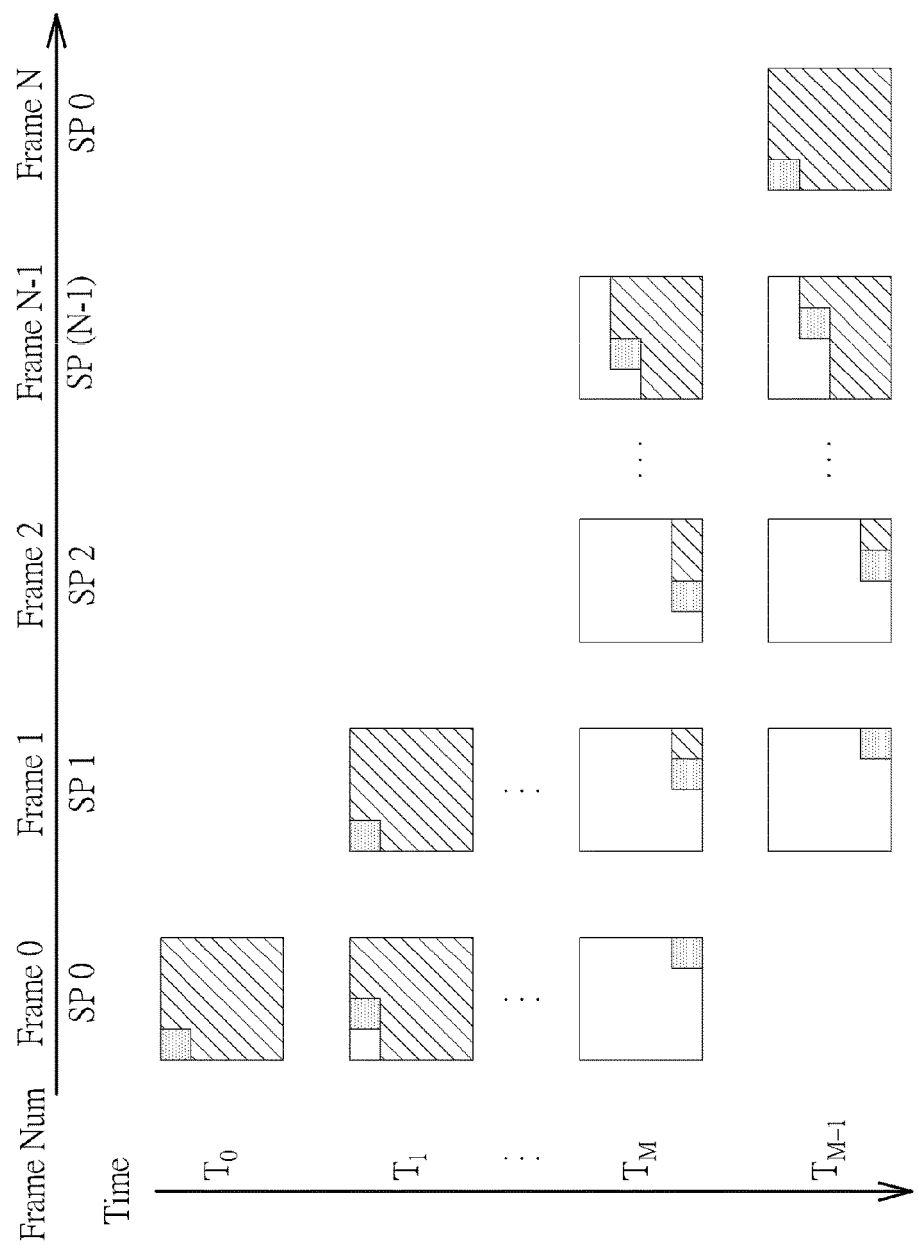
FIG. 13 is a diagram illustrating frame-level parallel entropy decoding according to an embodiment of the present invention.

Each of the aforementioned video decoders 900 and 1200 may be configured to perform frame-level parallel entropy decoding by using multiple syntax parsing circuits. FIG. 13 is a diagram illustrating frame-level parallel entropy decoding according to an embodiment of the present invention. The dotted region indicates a processing unit currently being decoded. The blank region indicates processing unit(s) already decoded. The slant-lined region indicates processing unit(s) not decoded yet. Suppose that each frame has (M+1) processing units (e.g., superblocks). Hence, each of the syntax parsing circuits 916_1-916_N may require a time period from $T_0$ to $T_M$ to accomplish entropy decoding of one complete frame. When properly controlled by the monitoring circuit 914 (or monitoring circuits 1214_1-1214_N), the syntax parsing circuits 916_1-916_N may start performing entropy decoding upon different frames at different time points $T_0$-$T_{N-1}$, respectively. In addition, when one of the syntax parsing circuits 916_1-916_N performs entropy decoding of a first processing unit in a first frame, another of the syntax parsing circuits 916_1-916_N performs entropy decoding of a second processing unit in a second frame, where the first frame and the second frame are successive frames, and the first processing unit and the second processing unit are not co-located processing units. In this way, frame-level parallel entropy decoding by using multiple syntax parsing circuit is achieved.

In aforementioned embodiments, the dispatcher may be implemented using dedicated hardware circuit or a general-purpose processor executing firmware or software, and/or the merger may be implemented using dedicated hardware circuit or a general-purpose processor executing firmware or software. Further, the storage device may be implemented using a single storage unit or multiple storage units. In one exemplary design, the storage device may be an internal storage device (e.g., a static random access memory). In another exemplary design, the storage device may bean external storage device (e.g., a dynamic random access memory). In yet another exemplary design, the storage device may be a hybrid storage device composed of an internal storage device and an external storage device.

Those skilled in the art will readily observe that numerous modifications and alterations of the device and method may be made while retaining the teachings of the invention.

Accordingly, the above disclosure should be construed as limited only by the metes and bounds of the appended claims.

The invention claimed is:

1. A syntax parsing apparatus comprising:
a plurality of syntax parsing circuits, each having at least entropy decoding capability, wherein the syntax parsing circuits are arranged to generate a plurality of entropy decoding results of a plurality of image regions within a same frame, respectively; and
a dispatcher, arranged to assign bitstream start points of the image regions to the syntax parsing circuits and trigger the syntax parsing circuits to start entropy decoding, respectively;
wherein the syntax parsing circuits comprise:
a first syntax parsing circuit, arranged to perform entropy decoding upon a first image region included in the image regions during a first processing time period; and
a second syntax parsing circuit, arranged to perform entropy decoding upon a second image region included in the image regions during a second processing time period, wherein the second processing time period is overlapped with the first processing time period.

2. The syntax parsing apparatus of claim 1, wherein each of the image regions is a tile or a slice.

3. The syntax parsing apparatus of claim 1, further comprising:
a storage device, shared by the syntax parsing circuits, wherein the storage device is arranged to store the entropy decoding results of the image regions.

4. The syntax parsing apparatus of claim 1, further comprising:
a plurality of storage devices, dedicated to the syntax parsing circuits, respectively;
wherein the storage devices are arranged to store the entropy decoding results of the image regions, respectively, and each of the syntax parsing circuits is arranged to perform entropy decoding upon image regions of a same column in the same frame.

5. The syntax parsing apparatus of claim 1, wherein each of the syntax parsing circuits comprises:
a counter, arranged to calculate counts of each symbol decoded by the syntax parsing circuit; and
the syntax parsing apparatus further comprises:
a merger, arranged to update a count table according to count data generated from counters of the syntax parsing circuits, wherein the count table is referenced for backward adaptation of probabilities.

6. The syntax parsing apparatus of claim 1, wherein the dispatcher is arranged to calculate a location of a start processing unit (PU) of a not-yet-decoded image region within the same frame, check if the syntax parsing circuits have any idle syntax parsing circuit, and check if spatial reference data of the not-yet-decoded image region is ready; and is further arranged to assign a bitstream start point of the not-yet-decoded image region to an idle syntax parsing circuit and trigger the idle syntax parsing circuit to start entropy decoding when the idle syntax parsing circuit is found in the syntax parsing circuits and the spatial reference data of the not-yet-decoded image region is ready.

7. A syntax parsing apparatus comprising:
a plurality of syntax parsing circuits, each having at least entropy decoding capability, wherein the syntax parsing circuits are arranged to generate a plurality of entropy decoding results of a plurality of frames, respectively; and
a dispatcher, arranged to assign bitstream start points of the frames to the syntax parsing circuits and trigger the syntax parsing circuits to start entropy decoding, respectively;
wherein the syntax parsing circuits comprise:
a first syntax parsing circuit, arranged to perform entropy decoding upon a first frame included in the frames during a first processing time period; and
a second syntax parsing circuit, arranged to perform entropy decoding upon a second frame included in the frames during a second processing time period, wherein the second processing time period is overlapped with the first processing time period.

8. The syntax parsing apparatus of claim 7, wherein the dispatcher is arranged to check if the syntax parsing circuits have any idle syntax parsing circuit, and is further arranged to assign a bitstream start point of a not-yet-decoded frame to an idle syntax parsing circuit and trigger the idle syntax parsing circuit to start entropy decoding when the idle syntax parsing circuit is found in the syntax parsing circuits.

9. The syntax parsing apparatus of claim 7, further comprising:
a monitoring circuit, shared by the syntax parsing circuits and arranged to monitor availability of temporal reference data required by each of the syntax parsing circuits;
wherein when temporal reference data required by entropy decoding of a processing unit is not available to a specific syntax parsing circuit, the monitoring circuit stalls the entropy decoding performed by the specific syntax parsing circuit.

10. The syntax parsing apparatus of claim 7, further comprising:
a plurality of monitoring circuits, dedicated to the syntax parsing circuits, respectively;
wherein each of the monitoring circuits is arranged to monitor availability of temporal reference data required by a corresponding syntax parsing circuit; the monitoring circuit stalls entropy decoding performed by the corresponding syntax parsing circuit when temporal reference data required by the entropy decoding of a processing unit is not available to the corresponding syntax parsing circuit.

11. A syntax parsing method comprising:
utilizing a plurality of syntax parsing circuits, each having at least entropy decoding capability, to generate a plurality of entropy decoding results of a plurality of image regions within a same frame, respectively; and
assigning bitstream start points of the image regions to the syntax parsing circuits and triggering the syntax parsing circuits to start entropy decoding, respectively;
wherein the syntax parsing circuits comprise a first syntax parsing circuit and a second syntax parsing circuit and utilizing the syntax parsing circuits comprises:
utilizing the first syntax parsing circuit to perform entropy decoding upon a first image region included in the image regions during a first processing time period; and
utilizing the second syntax parsing circuit to perform entropy decoding upon a second image region included in the image regions during a second processing time period, wherein the second processing time period is overlapped with the first processing time period.

12. The syntax parsing method of claim 11, wherein each of the image regions is a tile or a slice.

13. The syntax parsing method of claim 11, further comprising:

sharing a storage device by the syntax parsing circuits; and storing the entropy decoding results of the image regions into the storage device.

14. The syntax parsing method of claim 11, further comprising:

utilizing a plurality of storage devices dedicated to the syntax parsing circuits, respectively; and storing the entropy decoding results of the image regions into the storage devices, respectively;

wherein utilizing the syntax parsing circuits comprises:

utilizing each of the syntax parsing circuits to perform entropy decoding upon image regions of a same column in the same frame.

15. The syntax parsing method of claim 11, wherein each of the syntax parsing circuits comprises:

a counter, arranged to calculate counts of each symbol decoded by the syntax parsing circuit; and the syntax parsing method further comprises:

updating a count table according to count data generated from counters of the syntax parsing circuits, wherein the count table is referenced for backward adaptation of probabilities.

16. The syntax parsing method of claim 11, wherein assigning the bitstream start points of the image regions to the syntax parsing circuits and triggering the syntax parsing circuits to start entropy decoding comprises:

calculating a location of a start processing unit (PU) of a not-yet-decoded image region within the same frame;

checking if the syntax parsing circuits have any idle syntax parsing circuit;

checking if spatial reference data of the not-yet-decoded image region is ready; and assigning a bitstream start point of the not-yet-decoded image region to an idle syntax parsing circuit and triggering the idle syntax parsing circuit to start entropy decoding when the idle syntax parsing circuit is found in the syntax parsing circuits and the spatial reference data of the not-yet-decoded image region is ready.

17. A syntax parsing method comprising:

utilizing a plurality of syntax parsing circuits, each having at least entropy decoding capability, to generate a plurality of entropy decoding results of a plurality of frames, respectively; and assigning bitstream start points of the frames to the syntax parsing circuits and triggering the syntax parsing circuits to start entropy decoding, respectively;

wherein the syntax parsing circuits comprise a first syntax parsing circuit and a second syntax parsing circuit and utilizing the syntax parsing circuits comprises:

utilizing the first syntax parsing circuit to perform entropy decoding upon a first frame included in the frames during a first processing time period; and utilizing the second syntax parsing circuit to perform entropy decoding upon a second frame included in the frames during a second processing time period, wherein the second processing time period is overlapped with the first processing time period.

18. The syntax parsing method of claim 17, wherein assigning the bitstream start points of the frames to the syntax parsing circuits and triggering the syntax parsing circuits to start entropy decoding comprises:

checking if the syntax parsing circuits have any idle syntax parsing circuit;

assigning a bitstream start point of a not-yet-decoded frame to an idle syntax parsing circuit and trigger the idle syntax parsing circuit to start entropy decoding when the idle syntax parsing circuit is found in the syntax parsing circuits.

19. The syntax parsing method of claim 17, further comprising:

sharing a monitoring circuit by the syntax parsing circuits for monitoring availability of temporal reference data required by each of the syntax parsing circuits; and when temporal reference data required by entropy decoding of a processing unit is not available to a specific syntax parsing circuit, stalling the entropy decoding performed by the specific syntax parsing circuit.

20. The syntax parsing method of claim 17, further comprising:

utilizing a plurality of monitoring circuits dedicated to the syntax parsing circuits, respectively, wherein each of the monitoring circuits is arranged to monitor availability of temporal reference data required by a corresponding syntax parsing circuit; and stalling entropy decoding performed by the corresponding syntax parsing circuit when temporal reference data required by the entropy decoding of a processing unit is not available to the corresponding syntax parsing circuit.

* * * * *